No. 748,140. PATENTED DEC. 29, 1903.
G. C. ZWERK.
MACHINE FOR MAKING CEMENT SHINGLES.
APPLICATION FILED MAR. 30, 1903.
NO MODEL. 2 SHEETS—SHEET 1.
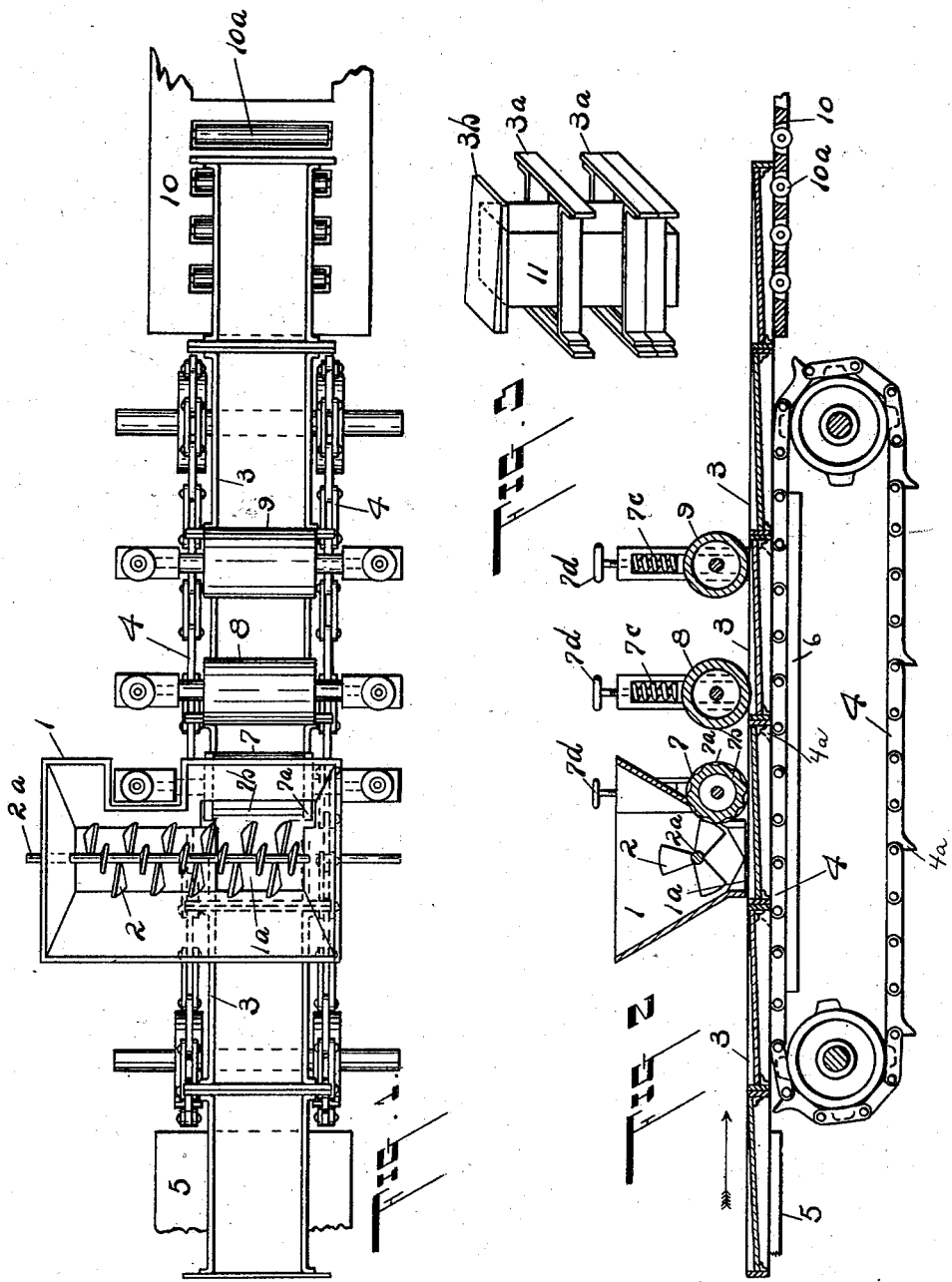
WITNESSES: George C. Zwerk, INVENTOR
James C. Hanson.
P. M. Holdsworth. BY
Geo. B. Willcox, ATTORNEY No. 748,140. PATENTED DEC. 29, 1903.
G. C. ZWERK.
MACHINE FOR MAKING CEMENT SHINGLES.
APPLICATION FILED MAR. 30, 1903.
NO MODEL. 2 SHEETS—SHEET 2.
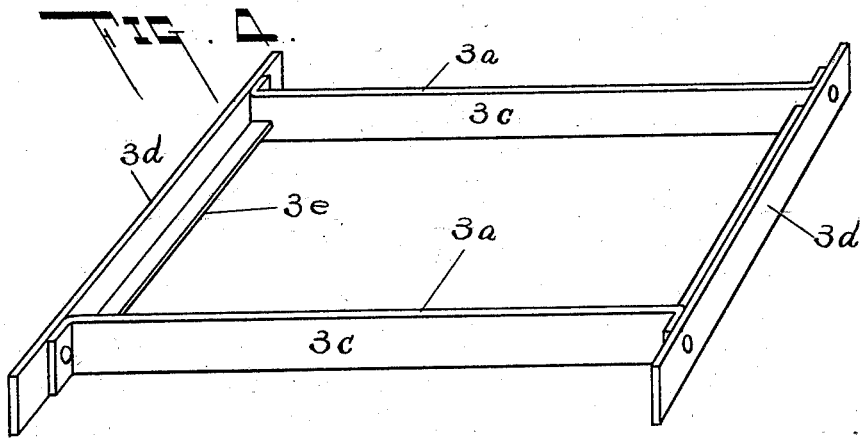
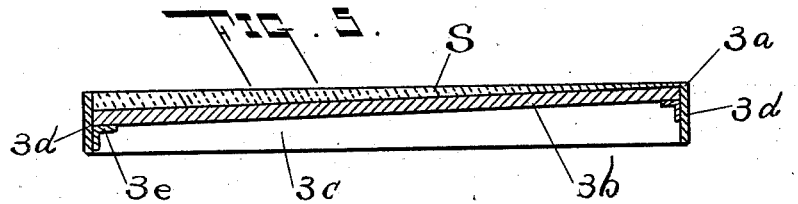
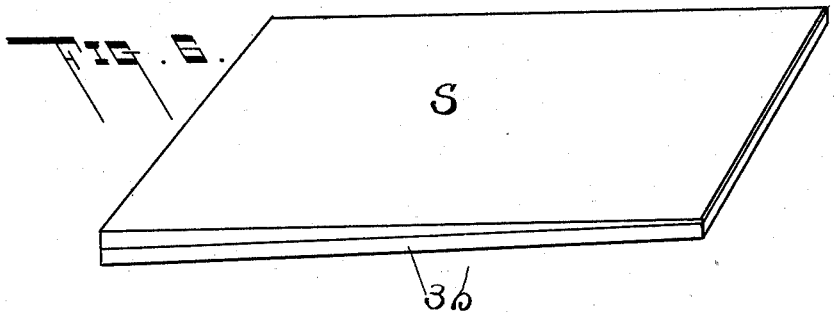
WITNESSES: George C. Zwerk INVENTOR
James C. Hanson.
P. M. Holdsworth. BY
Geo. B. Willcox ATTORNEY No. 748,140. Patented December 29, 1903.

UNITED STATES PATENT OFFICE.

GEORGE C. ZWERK, OF SAGINAW, MICHIGAN.

MACHINE FOR MAKING CEMENT SHINGLES.

SPECIFICATION forming part of Letters Patent No. 748,140, dated December 29, 1903.

Application filed March 30, 1903. Serial No. 150,228. (No model.)

*To all whom it may concern:*

Be it known that I, GEORGE C. ZWERK, a citizen of the United States, residing at Saginaw, in the county of Saginaw and State of Michigan, have invented certain new and useful Improvements in Machines for Making Cement Shingles; and I do hereby declare the following to be a full, clear, and exact description of the invention, such as will enable others skilled in the art to which it appertains to make and use the same.

This is a machine for making cement shingles.

The objects of the invention are to produce a machine by means of which raw unmixed materials fed into a hopper are thoroughly mixed and molded into shingles by consecutive continuous operations, so that the raw material fed into the hopper continuously is discharged continuously as finished product requiring only to be seasoned before use.

Auxiliary objects of the machine are to give an arrangement of parts by which the molds follow each other so close together as to prevent loss and waste of materials, to insure the thorough packing of materials into the molds, and to produce a mold having a light bottom of inexpensive material by means of which a shingle may be removed from the mold and on which it can be stored till seasoned, while the framework of the mold may be used over and over.

My invention is illustrated in the accompanying drawings, in which—

Figure 1 is a top plan view of the machine. Fig. 2 is a vertical longitudinal section of the same. Fig. 3 is a perspective view of the device for removing the bottom with the molded shingle from the frame of the mold. Fig. 4 is a perspective view of the frame of the mold. Fig. 5 is a vertical longitudinal section through the mold and shingle, and Fig. 6 is a perspective view of the bottom with the shingle thereon removed from the frame of the mold.

The construction and operation of the machine are as follows: Unmixed materials are fed into the hopper 1 and mixed therein by a series of paddles 2, helically disposed upon the shaft $2^a$, and are fed by the paddles through the openings $1^a$ in the hopper into the molds 3, which are drawn under it by the traveling chain 4 from the starting-table 5 over the packing-table 6, the material being drawn from the hopper and forced into the molds by the corrugated roller 7 and still further packed by the rollers 8 and 9, after which the molds 3 are carried by the chains 4 to the receiving-table 10. The receiving-table is of considerable length, so that the molded shingles have fifteen or twenty minutes to dry before reaching the end. There are rollers $10^a$ projecting above the surface of the table, over which the molds 3 move easily, being pushed by those which follow to the end of the table.

The molds 3 are formed of two parts—a supporting-frame $3^a$ and a removable bottom $3^b$. The framework is formed with side pieces $3^c$, having their ends turned outwardly at right angles and riveted to the end pieces $3^d$. An angle-bar $3^e$ for supporting the bottom of the mold is secured to the inside of each of the end pieces $3^d$. As is shown in Fig. 4, one of these angle-bars is near the bottom of the frame, while the other is near the top, so that the bottom is inclined downwardly from one end of the mold to the other to make the shingle thicker at one end than at the other. I prefer to make this bottom $3^b$ of a board, which, if desired, may be faced with a sheet of galvanized iron.

When the molds containing the shingles reach the end of the receiving-table 10, the shingles have set sufficiently to be removed from the frame of the molds. This is accomplished, as is shown in Fig. 3, by dropping them lightly on the top of a block or post 11, which holds the bottom, with the shingle S on its top, while the frame $3^a$ falls to the ground. The board, with the shingle on it, is then stored in the dry-house till the shingle is thoroughly seasoned. When several frames $3^a$ have collected at the post 11, they are removed and returned to the starting-table 5.

The conveying-chain 4 has upwardly-projecting fingers $4^a$, which are spaced apart a distance substantially equal to the outside length of the molds 3. These projecting fingers $4^a$ are adapted to catch the projecting ends of the forward end piece of each mold, and as the distance along the chain between the fingers is almost equal to the length of the frame 3 there is no space through which the material can lose between the forward end of one mold and the back end of the preceding one.

The roller 7, which draws the material from the hopper, has cylindrical ends $7^a$, which roll on the side bars of the mold, and a corrugated central portion $7^b$, whose highest points are flush with the cylindrical ends $7^a$. This leaves the shingle in the mold with a corrugated upper surface, the corrugations extending slightly above the sides of the mold. The smooth rollers 8 and 9, which follow and which roll on the side bars of the frame, depress the corrugations to the level of the frame, and so thoroughly pack the material into the molds. These rollers are yieldingly held by the springs $7^c$, whose tension is adjustable by means of screws $7^d$.

By the means described I have produced a machine operating to continuously produce shingles molded from cement in finished shape upon a supporting-board, on which they can be removed from the mold and supported while drying in storage. The machine is so constructed that there is very little loss of material in molding the shingles. Moreover, the use of the separable molds requires only a small number of frames, as they can be used over and over, while the inexpensive bottom can be stored with the shingle to support it in drying.

What I claim as my invention, and desire to secure by Letters Patent, is as follows:

1. A cement-shingle machine comprising a hopper; a revoluble shaft having helically-disposed paddles secured to it, within the hopper; a supporting-table beneath the hopper; conveying-chains traveling horizontally over the table; a corrugated packing-roller above the table; a smooth packing-roller above the table in the rear of the corrugated roller; and molds carried by the chains under the hopper and under the packing-rollers, said chains having projecting lugs spaced a distance apart nearly equal to the length of the molds.

2. A cement-shingle machine comprising a hopper; a revoluble shaft having helically-disposed paddles secured to it within the hopper; a supporting-table beneath the hopper; conveying-chains adapted to travel horizontally over the table; molds carried by the chains under the hopper, said molds comprising a rectangular frame and a removable inclined bottom; projecting lugs on said chains spaced a distance apart nearly equal to the length of the molds; a corrugated packing-roller projecting into the hopper, said corrugated roller having cylindrical ends adapted to roll on the rectangular frame; and a smooth packing-roller in the rear of said corrugated roller.

3. A mold for cement-shingle machines, said mold comprising a supporting-frame and a removable bottom; inwardly-turned flanges on said frame lower at one end than at the other to support the bottom in an inclined position, for the purposes set forth.

4. In a cement-shingle machine the combination of traveling molds; a corrugated cylindrical packing-roller adapted to roll on the tops of the molds; and a smooth circular cylindrical roller in the rear of the corrugated roller, also adapted to roll on the tops of the molds.

5. In a cement-shingle machine, traveling molds, and a corrugated cylindrical roller formed with circular cylindrical ends flush with the crests of the corrugations, said cylindrical ends being adapted to roll on the top of the molds for the purpose set forth.

In testimony whereof I affix my signature in presence of two witnesses.

GEORGE C. ZWERK.

Witnesses:
P. M. HOLDSWORTH,
JAMES C. HANSON.